(12) United States Patent
Bleile et al.

(10) Patent No.: US 8,991,243 B2
(45) Date of Patent: Mar. 31, 2015

(54) METHOD AND DEVICE FOR DIAGNOSING AN ACTUATOR FOR AN EXHAUST-GAS-DRIVEN SUPERCHARGER

(71) Applicants: Thomas Bleile, Stuttgart (DE); Patrick Menold, Stuttgart (DE)

(72) Inventors: Thomas Bleile, Stuttgart (DE); Patrick Menold, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 13/909,750

(22) Filed: Jun. 4, 2013

(65) Prior Publication Data

US 2013/0319093 A1 Dec. 5, 2013

(30) Foreign Application Priority Data

Jun. 4, 2012 (DE) .................. 10 2012 209 415

(51) Int. Cl.
*G01M 15/04* (2006.01)
*G01M 15/08* (2006.01)
*F02B 39/16* (2006.01)
*F02D 41/00* (2006.01)
*F02D 41/22* (2006.01)
*F02B 37/12* (2006.01)
*F02B 37/18* (2006.01)
*F02B 37/22* (2006.01)

(52) U.S. Cl.
CPC .............. *G01M 15/08* (2013.01); *F02B 39/16* (2013.01); *F02D 41/0007* (2013.01); *F02D 41/221* (2013.01); *Y02T 10/40* (2013.01); *Y02T 10/144* (2013.01); *F02B 2037/122* (2013.01); *F02B 37/183* (2013.01); *F02B 37/22* (2013.01)
USPC ........................................ 73/114.77

(58) Field of Classification Search
CPC ..................... F02D 41/0007; F02D 41/221
USPC ....................................... 73/114.77
See application file for complete search history.

(56) References Cited

U.S. PATENT DOCUMENTS

| | | | | |
|---|---|---|---|---|
| 5,447,031 | A * | 9/1995 | Betts et al. ............... | 60/603 |
| 6,134,890 | A * | 10/2000 | Church et al. ............ | 60/602 |
| 6,457,461 | B1 * | 10/2002 | Romzek .................. | 123/568.16 |
| 6,996,986 | B2 * | 2/2006 | Arnold .................... | 60/602 |
| 7,775,043 | B2 * | 8/2010 | Funke et al. ............. | 60/602 |
| 7,877,997 | B2 * | 2/2011 | Gruel ...................... | 60/602 |
| 8,141,358 | B2 * | 3/2012 | Kolmanovsky et al. ... | 60/605.1 |
| 8,146,358 | B2 * | 4/2012 | Greentree ............... | 60/605.1 |
| 8,661,876 | B2 * | 3/2014 | Malone ................... | 73/49.7 |
| 8,788,235 | B2 * | 7/2014 | Bleile et al. ............. | 702/113 |
| 2007/0289302 | A1 * | 12/2007 | Funke et al. ............. | 60/602 |
| 2009/0024295 | A1 * | 1/2009 | Swenson et al. ......... | 701/100 |
| 2013/0263653 | A1 * | 10/2013 | Brandt et al. ............ | 73/114.79 |

* cited by examiner

*Primary Examiner* — Freddie Kirkland, III
(74) *Attorney, Agent, or Firm* — Kenyon & Kenyon LLP

(57) ABSTRACT

A method for testing a supercharger actuator for a supercharger of a supercharged internal combustion engine, including adjusting the supercharger actuator from a first position to a second position, determining a rotational speed change information, which is a function of the change of the rotational speed of the supercharger resulting from the adjustment, and establishing a malfunction of the supercharger actuator as a function of the rotational speed change information.

20 Claims, 2 Drawing Sheets

METHOD AND DEVICE FOR DIAGNOSING AN ACTUATOR FOR AN EXHAUST-GAS-DRIVEN SUPERCHARGER

CROSS REFERENCE

The present application claims the benefit under 35 U.S.C. 119 of German Patent Application No, DE 102012209415.6 filed on Jun. 4, 2012, which is expressly incorporated herein by reference in its entirety.

FIELD

The present invention relates to supercharged internal combustion engines, in particular internal combustion engines that are supplied with air via an exhaust-gas-driven supercharger. The present invention particularly relates to diagnostic methods for testing the proper functioning of actuators for setting the efficiency or the compressor output of superchargers.

BACKGROUND INFORMATION

Exhaust-gas-driven superchargers normally have an actuator, which may be provided in the form or a waste gate actuator, a VTG actuator (VTG=variable turbine geometry) or the like. This supercharger actuator is used to define the proportion of the available exhaust-gas enthalpy that is to be provided in the form of mechanical energy for driving a compressor of the supercharger.

Like other actuators and sensors in an engine system for use in a motor vehicle, the supercharger actuator should also be tested regularly for its proper functioning. The test is usually performed by comparing an actual value and a setpoint value of a charging pressure that is provided by the compressor of the supercharger. Since it is not possible, however, to build up a supercharging pressure in every operating state, a test of the supercharger actuator is not reliably ensured in every operational case.

SUMMARY

The present invention provides for an example method for testing the proper functioning of a supercharger actuator, and for an example device, an example engine system, an example computer program and an example computer program product.

According to a first aspect, an example method is provided for testing a supercharger actuator for a supercharger of a supercharged internal combustion engine. The example method includes
  adjusting the supercharger actuator from a first position to a second position;
  determining a rotational speed change information, which is a function of the change of the rotational speed of the supercharger resulting from the adjustment;
  establishing a malfunction of the supercharger actuator as a function of the rotational speed change information.

The rotational speed change information may furthermore indicate a rotational speed gradient over time. In particular, the malfunction of the supercharger actuator may be established if the rotational speed change information indicates a rotational speed gradient that is lower than a specified rotational speed change threshold value.

According to the example method, an adjustment of the supercharger actuator from a first position to a second position is performed, particularly in a stationary operating state of the supercharger actuator, and a rotational speed change information is determined. On the basis of the rotational speed change information, it is then possible, particularly with the aid of a threshold value comparison, to test the proper functioning of the supercharger actuator.

According to one specific embodiment, the method may have the following steps:
  determining a first rotational speed information via a first rotational speed of a compressor of the supercharger in the first position of the supercharger actuator;
  determining a second rotational speed information via a second rotational speed of a compressor of the supercharger in the second position of the supercharger actuator;
  determining the difference between the first and the second rotational speed information as the rotational speed change information;
  establishing the malfunction of the supercharger actuator as a function of the difference between the first and the second rotational speed information.

Using the difference of the rotational speeds in the first position and the second position as a rotational speed change information is advantageous in that it may be ascertained in a simple manner. On the basis of the rotational speed difference between the first rotational speed information and the second rotational speed information, it is then possible to test the proper functioning of the supercharger actuator, in particular with the aid of a threshold value comparison.

There may be the further provision to establish the malfunction of the supercharger actuator if the difference between the first and the second rotational speed information is less than a specified threshold value. In other words, if there is no rotational speed change or if the rotational speed change is below a specific threshold value, it may be assumed that the supercharger actuator is not operating properly.

According to one specific embodiment, the specified threshold value may be selected as a function of an operating point, in particular as a function of an engine speed of the internal combustion engine and/or of a load of the internal combustion engine.

The first position of the supercharger actuator may correspond to a position, in which the supercharger has a minimum efficiency and/or the second position of the supercharger actuator may correspond to a position, in which the supercharger has a maximum efficiency.

Furthermore, there may be a provision for the first position of the supercharger actuator to correspond to a position that obtains prior to a requested load change of the internal combustion engine, and for the second position of the supercharger actuator to correspond to a position that obtains after a requested load change of the internal combustion engine.

According to another aspect, a device, in particular a processing unit, is provided for testing a supercharger actuator for a supercharger of a supercharged internal combustion engine, the device being designed for:
  adjusting the supercharger actuator from a first position to a second position;
  determining a rotational speed change information, which is a function of the change of the rotational speed of the supercharger resulting from the adjustment;
  establishing a malfunction of the supercharger actuator as a function of the rotational speed change information.

According to another aspect, an example engine system is provided having an internal combustion engine and the above device.

According to another aspect, an example computer program having program code is provided in order to carry out all steps of the above method when the computer program is executed on a computer or the above device.

According to another aspect, an example computer program product is provided, which includes a program code that is stored on a computer-readable data carrier and that implements the above method when it is executed on a data processing device.

BRIEF DESCRIPTION OF THE DRAWINGS

Preferred embodiments of the present invention are explained in greater detail below with reference to the figures.

DETAILED DESCRIPTION OF EXAMPLE EMBODIMENTS

Figure 1:
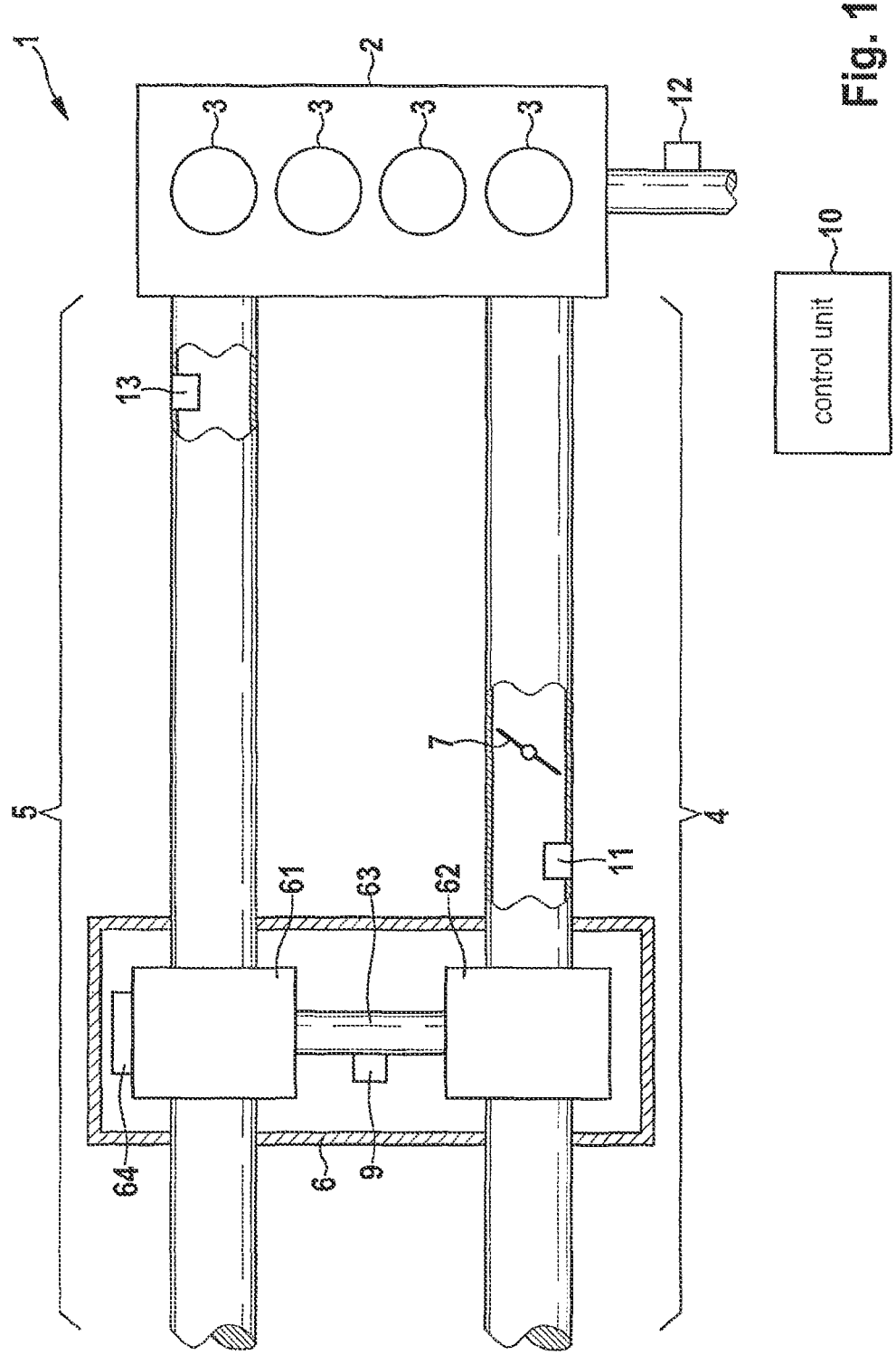
FIG. 1 shows a schematic representation of an engine system having an internal combustion engine and a supercharger.

FIG. 1 shows an engine system 1 having and internal combustion engine 2, which may be developed for example as a spark ignition engine or a diesel engine. Internal combustion engine 2 has cylinders 3 having a combustion chamber, in which a movable piston is situated so as to allow for a four-stroke operation.

Cylinders 3 may be supplied with fresh air via an air-supply system 4. In the operation of internal combustion engine 2, a fuel/air mixture is combusted in the combustion chambers and the combustion exhaust gas produced in the process is expelled and finally discharged into the environment.

A supercharger 6 is provided in the form of an exhaust-gas-driven turbocharger. Supercharger 6 has a turbine 61 situated in exhaust-gas discharge segment 5. Turbine 61 is mechanically coupled with a compressor 62, for example via a shaft 63.

Compressor 62 is situated in air supply system 4 and is used to draw in fresh air from the surroundings and to provide it under increased pressure, the so-called supercharging pressure, in a charging segment of air supply system 4, which is situated between compressor 62 and internal combustion engine 2.

Furthermore, shaft 63, by which compressor 62 is mechanically coupled with turbine 61, may be provided with a rotational speed sensor 9 in order to detect the rotational speed of the shaft of supercharger 6 and to provide a corresponding rotational speed information. Alternatively, rotational speed sensor 9 may also be situated on compressor 62 or turbine 61 in order to detect a movement of vanes of a vane wheel and to provide a corresponding rotational speed information.

Furthermore, a throttle valve 7 is provided in the charging segment of air supply system 4 in order to control the quantity of fresh air to be supplied to internal combustion engine 2.

The operation of engine system 1 is controlled with the aid of a control unit 10, which detects system states with the aid of suitable sensors and which controls actuators of engine system 1 in accordance with an external specification, for example a setpoint torque specification, which may be provided in the form of an accelerator pedal position. As system states, for example, the supercharging pressure may be detected by a downstream supercharging pressure sensor 11, the exhaust-gas back pressure may be detected by an exhaust-gas back pressure sensor 13 on the output side of internal combustion engine 2 in exhaust-gas-discharge segment 5, the engine speed of internal combustion engine 2 may be detected by an engine speed sensor 12 on a crankshaft of internal combustion engine 2 and the like, or may be ascertained by modeling.

Furthermore, actuators are provided such as, for example, for setting throttle valve 7, for setting the fuel injectors (not shown) and the like, in order to control the engine functions.

For operating internal combustion engine 2, it is necessary to be able to set the supercharging pressure. This is achieved in that the compressor output to be provided by supercharger 6 is adjustable. For this purpose an actuator 64 is provided, which is situated on the turbine side of supercharger 6 or on turbine 61 and may be developed in the form of a waste gate valve, in the form of a VTG actuator for setting a variable turbine geometry or as another kind of actuator. This supercharger actuator 64 is adjustable in order to determine a proportion of the exhaust-gas enthalpy to be converted by turbine 61, which is to be converted into a compressor output. Supercharger actuator 64 is thus used to set the efficiency with which the exhaust-gas enthalpy of the combustion exhaust gas is converted into mechanical energy.

Supercharger actuator 64 is generally developed electromechanically and therefore only has a limited reliability such that a regular functional test is necessary in engine system 1, especially if the latter is provided for operating a motor vehicle.

Since the rotational speed information of rotational speed sensor 9, which indicates a rotational speed of shaft 63, is a measure for the compressor output of compressor 62, it may be used to perform a functional test of supercharger actuator 64.

Figure 2:
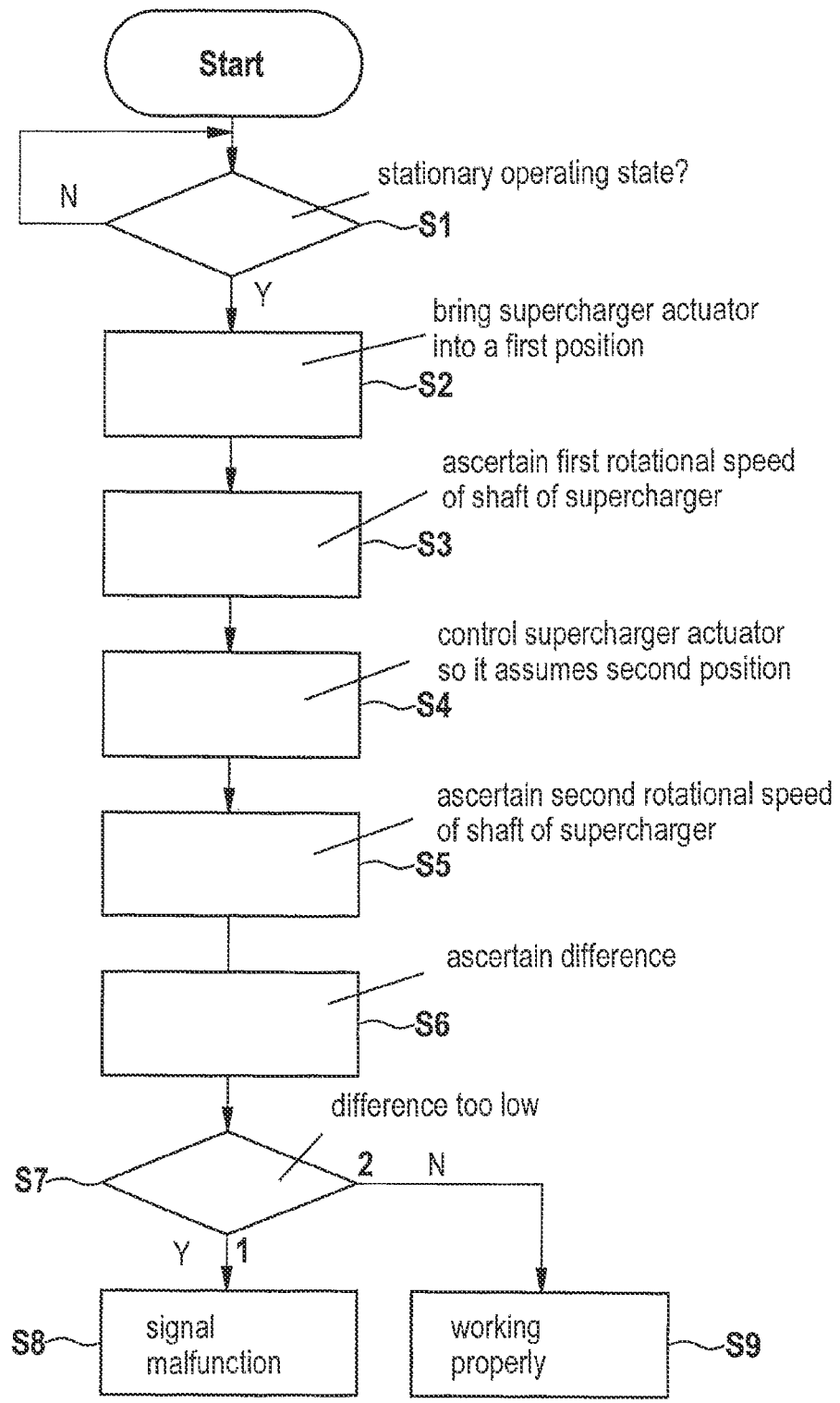
FIG. 2 shows a flow chart for illustrating a method for testing a function of a supercharger actuator.

A method for checking supercharger actuator 64 may be performed for example in control unit 10 as shown in the flow chart of FIG. 2.

First, a check is performed in step S1 to determine whether engine system 1 is in a stationary operating state, i.e., an operating state of a constant load and rotational speed. If this is the case (alternative: yes), then the method is continued with step S2, otherwise (alternative: no) the system reverts to step S1.

The stationary operating state is preferably defined by an operating state of a constant turbocharger rotational speed and/or of a load that is as low as possible, as obtains for example when internal combustion engine 2 is idling.

In step S2, supercharger actuator 64 is initially brought into a first position, for example into a position, in which the efficiency of supercharger 6 reaches a minimum. The resulting first rotational speed of shaft 63 of supercharger 6 is then ascertained in step S3 as the first rotational speed information.

Subsequently, in a step S4, supercharger actuator 64 is controlled in such a way that it assumes a second position of supercharger actuator 64, for example a position, in which supercharger 6 has a maximum efficiency. In step S5, the rotational speed of shaft 63 is then ascertained as the second rotational speed information.

In a step S6, a difference information is determined, which is ascertained as a difference or other deviation between the first and the second rotational speed information.

Alternatively, it is also possible to determine a rotational speed gradient over time, an excessively slow response of supercharger actuator 64 being indicated by an excessively low rotational speed gradient in terms of its absolute value.

In a step S7, a threshold value comparison is performed for the difference information according to a specified threshold value. The specified threshold value is a function of the operating point and may be determined according to a characteristics may which is stored in control unit 10 or in another storage unit, as a function of one or multiple parameters that indicate an operating state of internal combustion engine 2 such as the ambient pressure, the temperature of the ambient air, the rotational speed of internal combustion engine 2, the load of the internal combustion engine and the like.

If it is determined in step S7 that the ascertained difference information is too low (alternative 1), i.e., the rotational speed difference is smaller than the specified threshold value, then it may be assumed that supercharger actuator 64 is stuck in a specific position, which corresponds to a malfunction of supercharger actuator 64. This malfunction is signaled in step S8.

If it is determined in step S7 that the ascertained difference information is greater than the specified threshold value (alternative 2), i.e., the rotational speed difference is greater than the specified threshold value, then it may be assumed in step S9 that supercharger actuator 64 is working properly.

When using the rotational speed gradient over time, the threshold value comparison may be performed alternatively based on a rotational speed gradient threshold value, which is fixed and is either based on a specific adjustment speed of supercharger actuator 64 or as a function of an adjustment speed of the adjustment of supercharger actuator 64.

In order to determine whether supercharger actuator 64 is in the first position of the minimum efficiency or in the second position of the maximum efficiency of supercharger 6, a charging pressure evaluation may be performed at a higher exhaust-gas enthalpy supply, for example at a higher rotational speed and load of internal combustion engine 2.

Setting the first and the second position may also occur in the opposite order, it being necessary to obtain in terms of an absolute value a minimum rotational speed difference between the rotational speeds that were detected in the two positions, in order to detect a properly functioning supercharger actuator 64.

It is furthermore possible to perform a passive diagnosis in which the rotational speed of supercharger 6 is evaluated in a load change from a low load, such as for example when internal combustion engine 2 is idling, to a higher load, such as for example when a higher torques is requested by the driver. When changing from a low to a high load, supercharger actuator 64 is normally moved in the direction of a higher efficiency of supercharger 6. Depending on the exhaust-gas enthalpy supply for supercharger 6, the ambient conditions and the engine operating point, a change of the rotational speed of shaft 63 of supercharger 6 over time is now to be expected. If the measured change deviates markedly from the expected change, then supercharger actuator 64 was not displaced properly into the position of maximum efficiency and is recognized as defective.

What is claimed is:

1. A method for testing a supercharger actuator for a supercharger of a supercharged internal combustion engine, comprising:
   adjusting the supercharger actuator from a first position to a second position;
   determining rotational speed change information, the rotational speed information being a function of a change of a rotational speed of the supercharger resulting from the adjustment; and
   establishing a malfunction of the supercharger actuator as a function of the rotational speed change information, wherein the rotational speed change information is a difference between a first rotational speed in the first position and a second rotational speed in the second position.

2. The method as recited in claim 1, wherein the rotational speed change information indicates a rotational speed gradient over time.

3. The method as recited in claim 2, wherein the malfunction of the supercharger actuator is established if the rotational speed change information indicates a rotational speed gradient that is lower than a specified rotational speed change threshold value.

4. The method as recited in claim 1, further comprising:
   determining the first rotational speed of a compressor of the supercharger in the first position of the supercharger actuator;
   determining the second rotational speed of the compressor of the supercharger in the second position of the supercharger actuator;
   determining the difference between the first rotational speed and the second rotational speed as the rotational speed change information; and
   establishing the malfunction of the supercharger actuator as the function of the difference between the first rotational speed and the second rotational speed.

5. The method as recited in claim 4, wherein the malfunction of the supercharger actuator is established if the difference is less than a specified threshold value.

6. The method as recited in claim 5, wherein the specified threshold value is selected as a function of an operating point.

7. The method as recited in claim 6, wherein the operating point is at least one of an engine speed of the internal combustion engine and a load of the internal combustion engine.

8. The method as recited in claim 1, wherein at least one of the following is satisfied: i) the first position of the supercharger actuator corresponds to a position in which the supercharger has a minimum efficiency, and ii) the second position of the supercharger actuator corresponds to a position in which the supercharger has a maximum efficiency.

9. The method as recited in claim 1, wherein the first position of the supercharger actuator corresponds to a position that occurs prior to a requested load change of the internal combustion engine, and the second position of the supercharger actuator corresponds to a position that occurs after a requested load change of the internal combustion engine.

10. A processing unit for testing a supercharger actuator for a supercharger of a supercharged internal combustion engine, comprising:
    a processing arrangement configured to adjust the supercharger actuator from a first position to a second position, determine a rotational speed change information, the rotational speed change information being a function of the change of the rotational speed of the supercharger resulting from the adjustment, and establish a malfunction of the supercharger actuator as a function of the rotational speed change information, wherein the rotational speed change information is a difference between a first rotational speed in the first position and a second rotational speed in the second position.

11. An engine system, comprising:
    an internal combustion engine; and
    a processing unit for testing a supercharger actuator for a supercharger of the internal combustion engine, the processing unit being configured to adjust the supercharger actuator from a first position to a second position, determine a rotational speed change information, the rotational speed change information being a function of the change of the rotational speed of the supercharger resulting from the adjustment, and establish a malfunction of the supercharger actuator as a function of the rotational speed change information, wherein the rotational speed change information is a difference between a first rotational speed in the first position and a second rotational speed in the second position.

12. A computer-readable data carrier storing a computer program having a computer program, which is executable by a processor, comprising:
a program code arrangement having program code to test a supercharger actuator for a supercharger of a supercharged internal combustion engine, by performing the following:
adjusting the supercharger actuator from a first position to a second position;
determining a rotational speed change information, the rotational speed change information being a function of a change of a rotational speed of the supercharger resulting from the adjustment; and
establishing a malfunction of the supercharger actuator as a function of the rotational speed change information;
wherein the rotational speed change information is a difference between a first rotational speed in the first position and a second rotational speed in the second position.

13. The computer-readable data carrier as recited in claim 12, wherein the rotational speed change information indicates a rotational speed gradient over time.

14. The computer-readable data carrier as recited in claim 13, wherein the malfunction of the supercharger actuator is established if the rotational speed change information indicates a rotational speed gradient that is lower than a specified rotational speed change threshold value.

15. The computer-readable data carrier as recited in claim 12, further comprising:
determining the first rotational speed of a compressor of the supercharger in the first position of the supercharger actuator;
determining the second rotational speed of the compressor of the supercharger in the second position of the supercharger actuator;
determining the difference between the first rotational speed and the second rotational speed as the rotational speed change information; and
establishing the malfunction of the supercharger actuator as the function of the difference between the first rotational speed and the second rotational speed.

16. The computer-readable data carrier as recited in claim 15, wherein the malfunction of the supercharger actuator is established if the difference is less than a specified threshold value.

17. The computer-readable data carrier as recited in claim 16, wherein the specified threshold value is selected as a function of an operating point.

18. The computer-readable data carrier as recited in claim 17, wherein the operating point is at least one of an engine speed of the internal combustion engine and a load of the internal combustion engine.

19. The computer-readable data carrier as recited in claim 12, wherein at least one of the following is satisfied: i) the first position of the supercharger actuator corresponds to a position in which the supercharger has a minimum efficiency, and ii) the second position of the supercharger actuator corresponds to a position in which the supercharger has a maximum efficiency.

20. The computer-readable data carrier as recited in claim 12, wherein the first position of the supercharger actuator corresponds to a position that occurs prior to a requested load change of the internal combustion engine, and the second position of the supercharger actuator corresponds to a position that occurs after a requested load change of the internal combustion engine.

* * * * *